(12) United States Patent
Okker et al.

(10) Patent No.: US 8,107,880 B2
(45) Date of Patent: Jan. 31, 2012

(54) MULTIRADIO MANAGEMENT THROUGH SHARED TIME ALLOCATION

(75) Inventors: Jani Okker, Tampere (FI); Jussi Ylänen, Lempäälä (FI); Ville Pernu, Tampere (FI)

(73) Assignee: Nokia Corporation, Espoo (FI)

( * ) Notice: Subject to any disclaimer, the term of this patent is extended or adjusted under 35 U.S.C. 154(b) by 1096 days.

(21) Appl. No.: 11/691,734

(22) Filed: Mar. 27, 2007

(65) Prior Publication Data

US 2008/0240048 A1    Oct. 2, 2008

(51) Int. Cl.
H04B 7/00 (2006.01)

(52) U.S. Cl. ........ 455/41.2; 370/338; 370/345; 370/346

(58) Field of Classification Search ................. 370/326, 370/329, 330, 334, 345, 338, 346, 465; 455/41.2
See application file for complete search history.

(56) References Cited

U.S. PATENT DOCUMENTS

| | | | | |
|---|---|---|---|---|
| 6,072,784 | A * | 6/2000 | Agrawal et al. | 370/311 |
| 6,590,878 | B1 * | 7/2003 | Uchida et al. | 370/330 |
| 2005/0059347 | A1 | 3/2005 | Haartsen | |
| 2006/0092910 | A1 * | 5/2006 | Dertz et al. | 370/348 |
| 2006/0194600 | A1 * | 8/2006 | Palin et al. | 455/512 |
| 2006/0209882 | A1 * | 9/2006 | Han et al. | 370/465 |
| 2006/0227785 | A1 * | 10/2006 | Cournut et al. | 370/392 |
| 2006/0274704 | A1 | 12/2006 | Desai et al. | |
| 2007/0019641 | A1 * | 1/2007 | Pai et al. | 370/389 |
| 2007/0021066 | A1 * | 1/2007 | Dravida et al. | 455/41.2 |
| 2007/0058605 | A1 * | 3/2007 | Meylan et al. | 370/346 |
| 2007/0197256 | A1 * | 8/2007 | Lu et al. | 455/552.1 |

OTHER PUBLICATIONS

A. Palin et al., "VoIP call over WLAN with Bluetooth headset—multiradio interoperability solutions," Personal, Indoor and Mobile Radio Communications, 2005, PIMRC 2005, IEEE 16th International Symposium on Berlin, Germany, Sep. 11-14, 2005, Piscataway, NJ, USA, IEEE, vol. 3, Sep. 11, 2005, pp. 1560-1564, XP010927402.

Chiasserini et al., "Coexistence mechanisms for interference mitigation between IEEE 802.11 WLANs adn bluetooth", Proceedings IEEE Infocom 2002, The Conference on Computer Communications, 21st Annual Joint Conference of the IEEE Computer and Communications Societies, New York, NY, Jun. 23-27, 2002; Proceedings IEEE Infocom, The Conference on Computer Communi, vol. 2, Jun. 23, 2002, pp. 590-598, XP010593620.

International Search Report of PCT/IB2008/050391, mailed Nov. 24, 2008.

* cited by examiner

Primary Examiner — Kent Chang
Assistant Examiner — Dinh P Nguyen
(74) Attorney, Agent, or Firm — Locke Lord LLP

(57) ABSTRACT

A system for managing the operation of a plurality of radio modules integrated within the same wireless communication device. In at least one embodiment of the present invention, time may be allocated for use in communicating over one or more wireless communication mediums. The allocated time may take the form of timeslots. The timeslots may be dedicated or shared timeslots, the type of timeslot affecting the behavior of each wireless communication medium. Use of shared timeslots may, for example, be determined locally to the radio modules based on a relative priority between the wireless communication mediums sharing the timeslot.

29 Claims, 18 Drawing Sheets

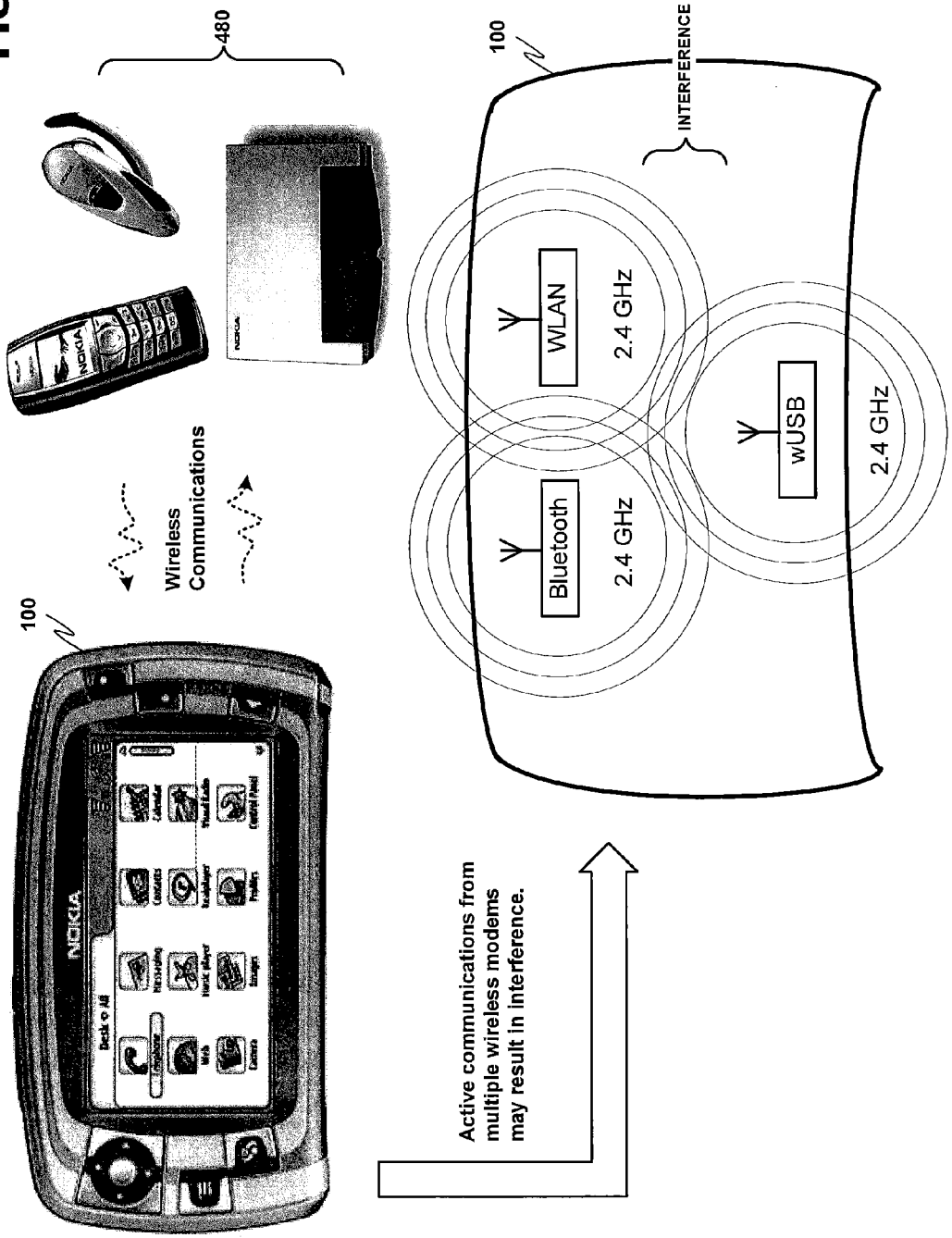

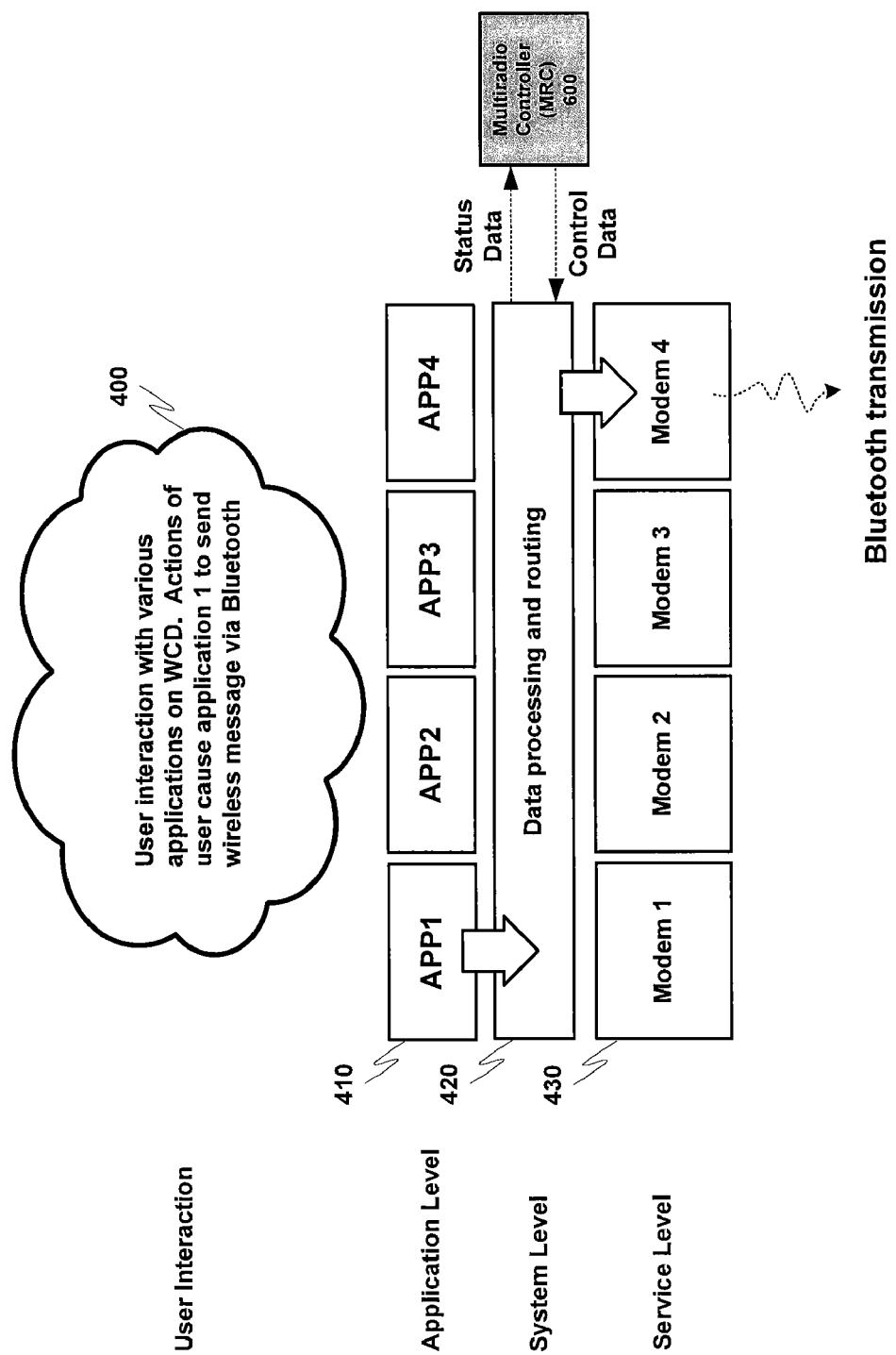

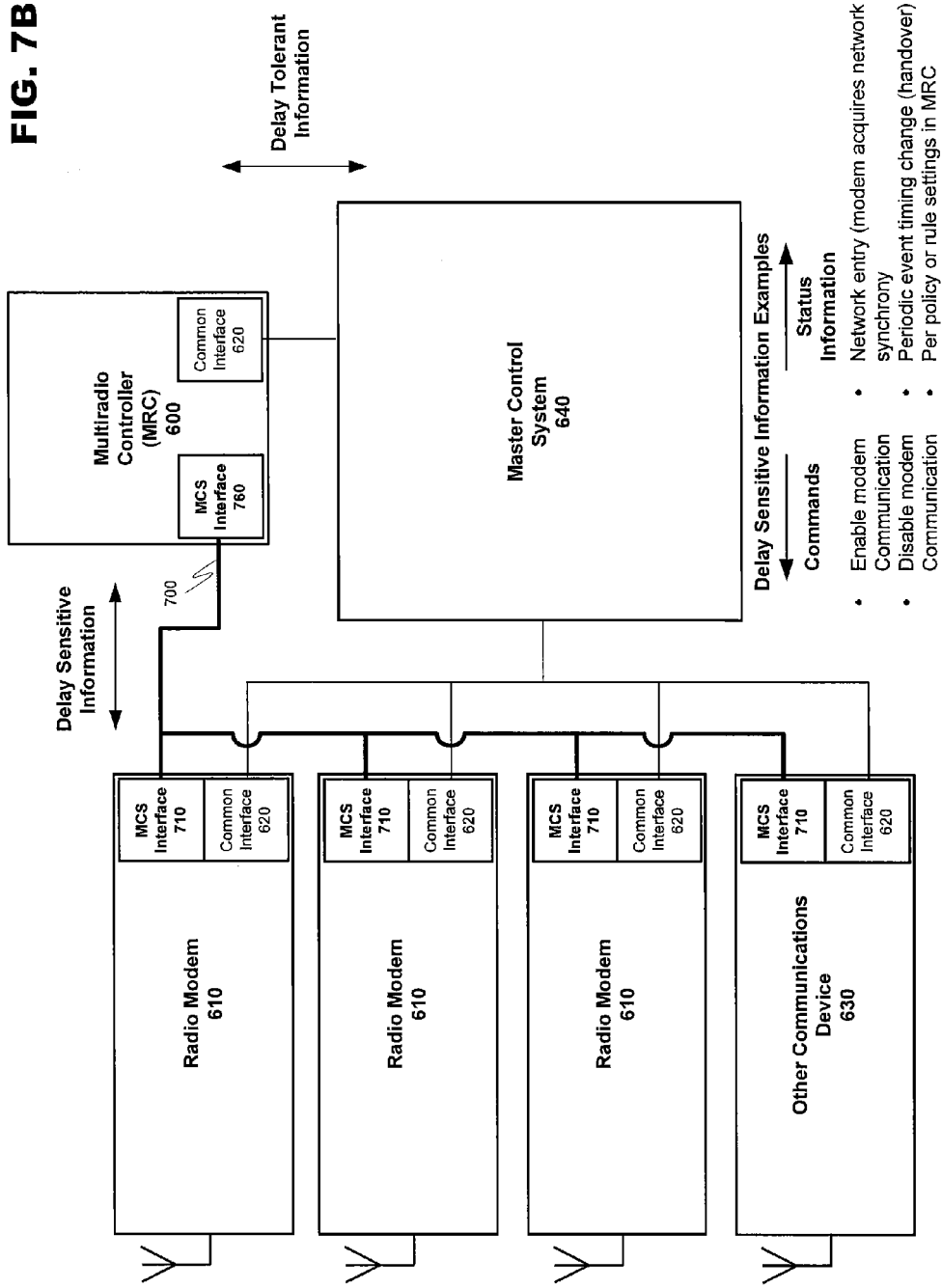

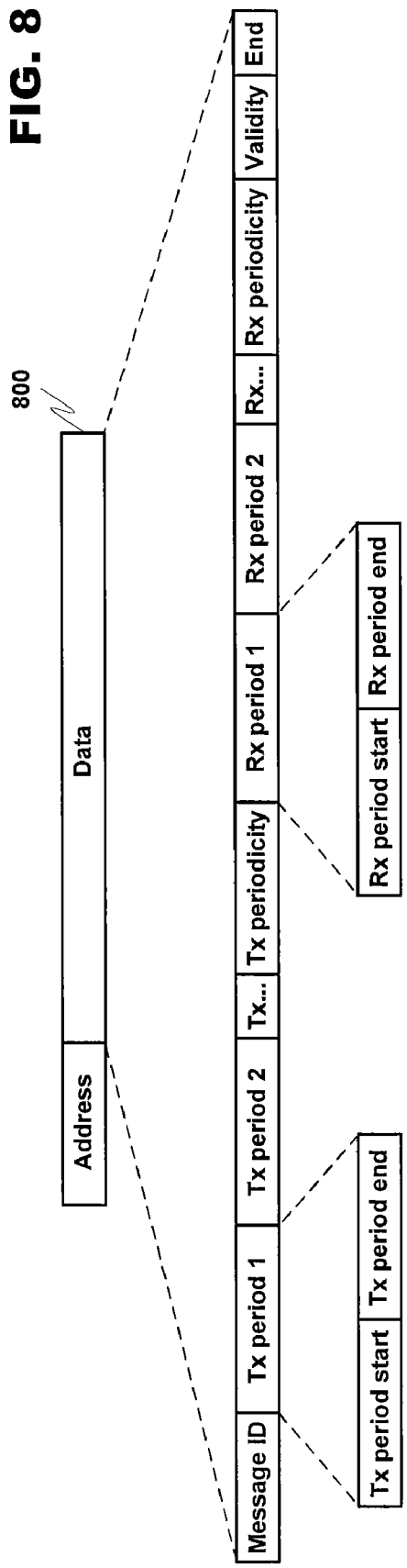

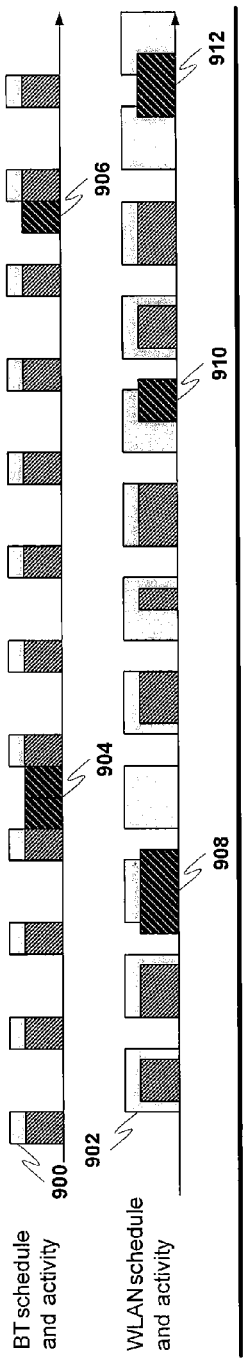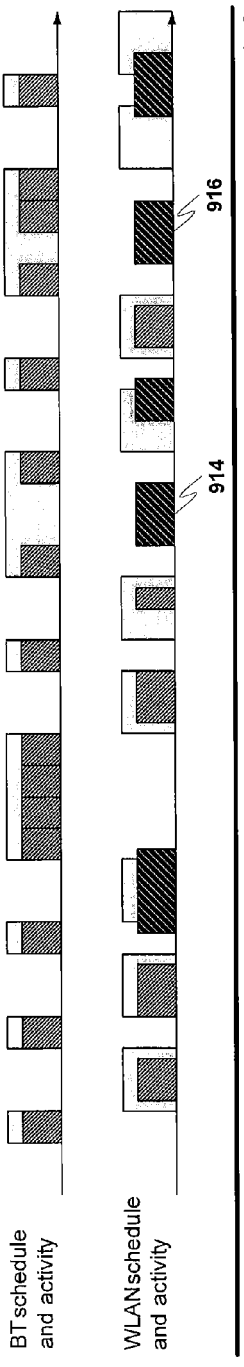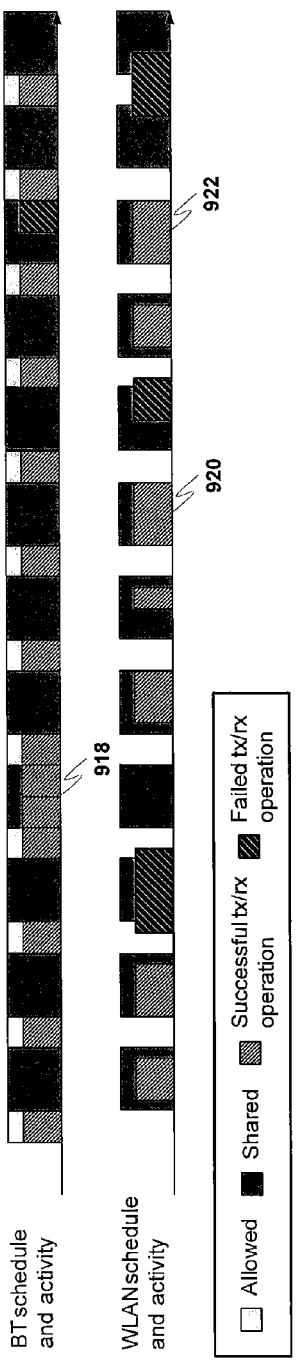

MULTIRADIO MANAGEMENT THROUGH SHARED TIME ALLOCATION

BACKGROUND OF INVENTION

1. Field of Invention

The present invention relates to a system for managing radio modules integrated within a wireless communication device, and more specifically, to a multiradio control system enabled to create an operational schedule for two or more concurrently operating radio modules, wherein at least some of timeslots allocated by the operational schedule are shared timeslots.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receives data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Near Field communication (NFC) technologies include machine-readable mediums such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and machine readable communication resources also often include multiple wireless mediums or radio protocols for each category. A multitude of wireless media options may assist a WCD in quickly adjusting to its environment, for example, communicating both with a WLAN access point and a Bluetooth™ peripheral device, possibly (and probably) at the same time.

Given the large array communication features that may be compiled into a single device, it is foreseeable that a user will need to employ a WCD to its full potential when replacing other productivity related devices. For example, a user may use a multifunction WCD to replace traditional tools such as individual phones, facsimile machines, computers, storage media, etc. which tend to be more cumbersome to both integrate and transport. In at least one use scenario, a WCD may be communicating simultaneously over numerous different wireless mediums. A user may utilize multiple peripheral Bluetooth™ devices (e.g., a headset and a keyboard) while having a voice conversation over GSM and interacting with a WLAN access point in order to access the Internet. Problems may occur when these concurrent transactions cause interference with each other. Even if a communication medium does not have an identical operating frequency as another medium, a radio modem may cause extraneous interference to another medium. Further, it is possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

While a WCD may engage in wireless communication with a multitude of other devices concurrently, in some instances a resource constraint may arise where two or more of the peripheral devices are communicating using radio protocols that are implemented into a single radio modem in the WCD.

Such a scenario may occur, for example, when both a Bluetooth™ device and a Wibree™ device are being used concurrently. Wibree™ is an open standard industry initiative extending local connectivity to small devices with technology that increases the growth potential in these market segments. Wibree™ technology may complement close range communication with Bluetooth™-like performance in the 0-10 m range with a data rate of 1 Mbps. Wibree™ is optimized for applications requiring extremely low power consumption, small size and low cost. Wibree™ may be implemented either as stand-alone chip or as Bluetooth™-Wibreem™ dual-mode chip. More information can be found on the Wibree™ website: www.wibree.com. Due to the similarity of these two radio protocols, a WCD may only include one radio module assigned to handle communication for both wireless communication mediums. One radio modem attempting to communicate with multiple devices using separate radio protocols, also known as a dual-mode or multimode radio modem, may experience communication errors due to the collision of messages from the peripheral devices. Wireless communication devices are usually scheduled only within their own radio protocol, and therefore, may be unaware that other simultaneous transactions may be occurring in a dual-mode radio modem over another radio protocol.

Technology is now emerging to enable a WCD to schedule communications amongst a plurality of modems integrated within the same device, however, this control strategy may not necessarily benefit a dual-mode radio modem where the conflicts are not known at the operating system level, but only by the modem itself. Further, the allocation of communication bandwidth for only one specific wireless communication medium is necessarily limiting. In other words, at least one benefit may be realized by reserving time for a specific wireless communication medium in that there will a higher probability of successful communication. However, the rigid allocation of this time will also reduce the flexibility of scheduling for the WCD, and therefore, may result in less efficient wireless overall communication for the device.

What is therefore needed is a system for managing wireless resources in the same device that utilize potentially conflicting wireless communication mediums. The system should be able to manage the wireless communication mediums so as to avoid conflicts, while still allowing for some flexibility in the way time is allocated within a WCD. More specifically, the system should be able to allocate timeslots to critical resources to help ensure successful communication, while allowing less crucial resources to be managed in a more flexible manner.

SUMMARY OF INVENTION

The present invention includes at least a method, device, computer program, controller, radio module and system for managing the operation of a plurality of radio modules integrated within the same WCD. In at least one embodiment of the present invention, time may be allocated for use in communicating over one or more wireless communication mediums. The allocated time may take the form of timeslots. The timeslots may be dedicated or shared timeslots, the type of timeslot affecting the behavior of each wireless communication medium.

The present invention, in at least one embodiment, may be implemented in a WCD including at least a multiradio controller and one or more radio modules. The multiradio controller may be coupled to at least the one or more radio modules in order to manage wireless communication for the WCD. This coupling may further include a communication bus dedicated to conveying delay-sensitive information between components in the WCD. The multiradio controller may receive at least messaging information from other resources in the WCD and status information from the one or more radio modules, and may in turn utilize this information to formulate operational schedules for controlling each wireless communication medium. These operational schedules may then be sent to each radio module. Local control resources in the radio modules may then utilize the schedules to communicate over one or more of the wireless communication mediums, as some of these resources may be multimode radio modules.

In a further example of the present invention, the time in the operational schedule may be divided into timeslots during which a wireless communication medium is permitted to operate. These timeslots may by dedicated timeslots or shared timeslots. Dedicated timeslots pertain to a particular wireless communication medium. Shared timeslots may be allocated amongst a plurality of wireless communication mediums. When more than one wireless communication medium sharing a timeslot wants to communicate, a determination may be made locally among the one or more radio modules supporting these wireless communication mediums as to how the time may be allocated. This decision may include a further determination of relative priority amongst the wireless communication mediums competing for the timeslot. In this way, shared timeslots may be allocated to wireless communication mediums sharing the timeslots on an as-needed basis, giving additional flexibility to communication management.

DESCRIPTION OF DRAWINGS

The invention will be further understood from the following detailed description of a preferred embodiment, taken in conjunction with appended drawings, in which:

FIG. 4B discloses an operational example wherein interference occurs when utilizing multiple radio modems simultaneously within the same wireless communication device.

FIG. 6C discloses an exemplary operational description of a wireless communication device including a multiradio controller in accordance with at least one embodiment of the present invention.

FIG. 7B discloses a more detailed structural diagram of FIG. 7A including the multiradio control system and the radio modems.

FIG. 8 discloses an exemplary information packet usable with at least one embodiment of the present invention.

FIG. 9A discloses an example of communication activity between communication mediums wherein only Bluetooth™ SCO communication activity is scheduled in accordance with at least one embodiment of the present invention.

FIG. 9B discloses an example of communication activity between communication mediums wherein Bluetooth™ SCO and ACL communication activity are scheduled in accordance with at least one embodiment of the present invention.

FIG. 9C discloses an example of communication activity between communication mediums wherein SCO and shared communication activity are scheduled in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
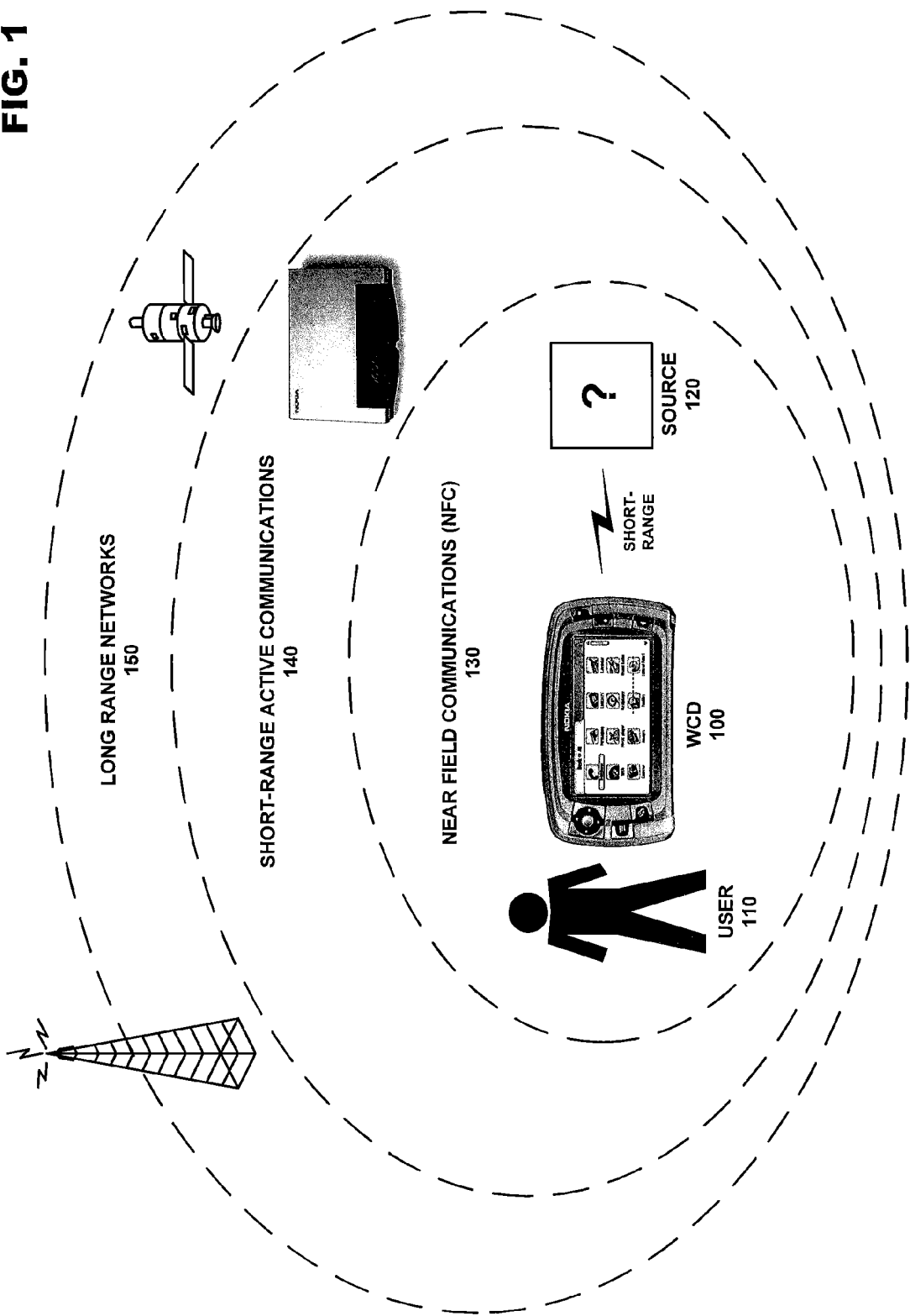
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communication (NFC) 130 includes various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
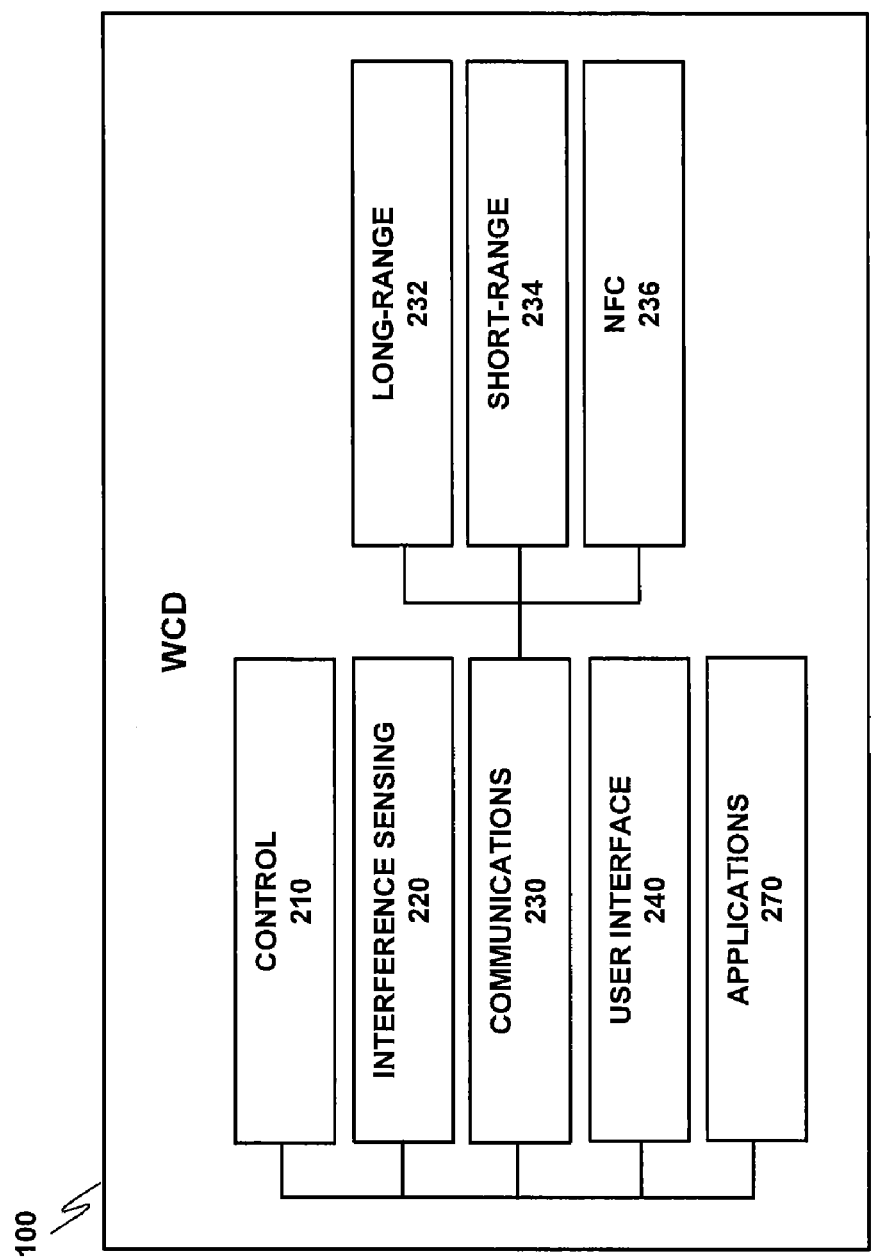
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and NFC module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
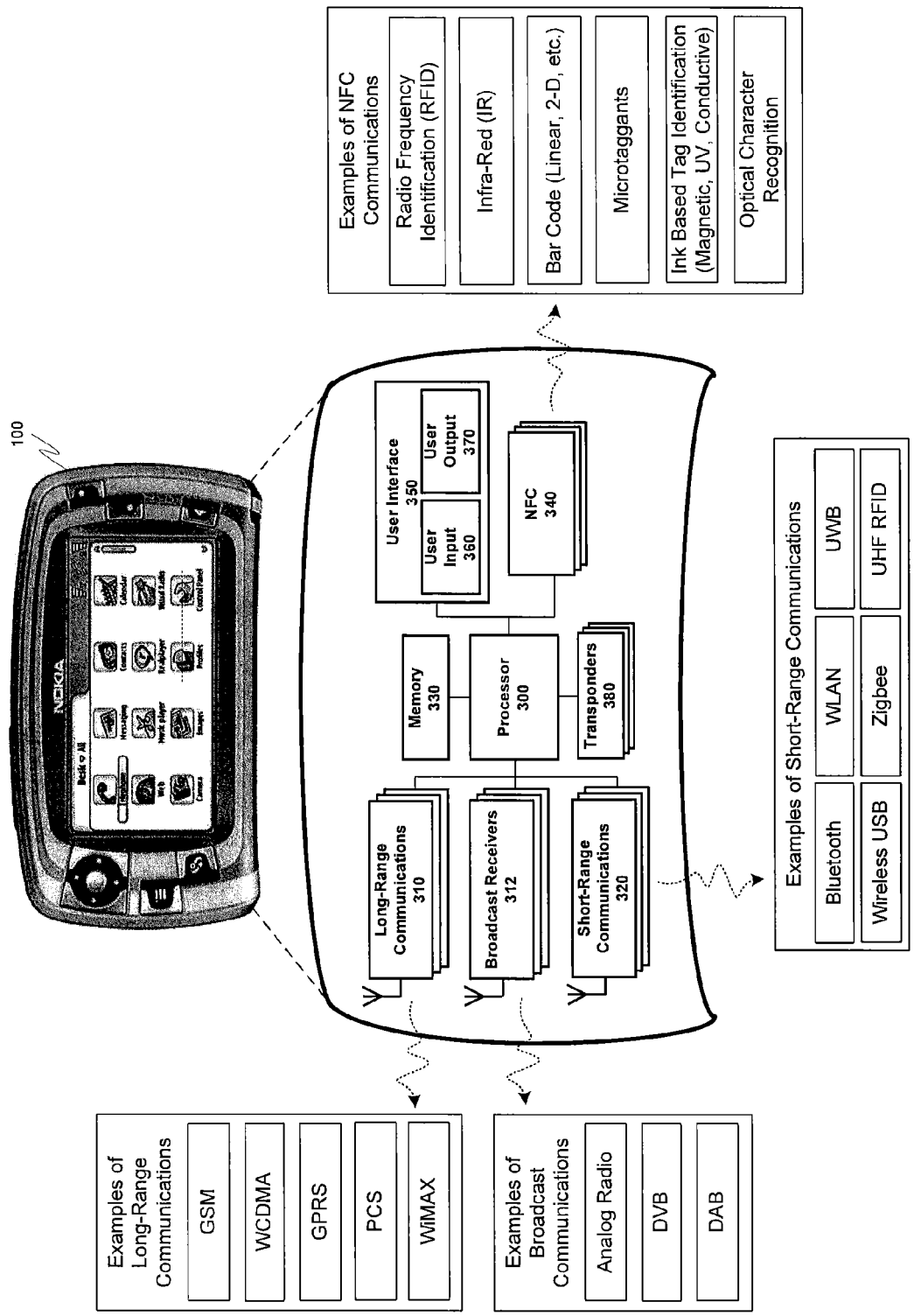
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

NFC 340, also depicted in FIG. 3, may provide functionality related to the short-range scanning of machine-readable data. For example, processor 300 may control components in NFC 340 to generate RF signals for activating an RFID transponder, and may in turn control the reception of signals from an RFID transponder. Other short-range scanning methods for reading machine-readable data that may be supported by the NFC 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for the NFC 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. In addition, a scanner may be mounted (e.g., as previously discussed above with regard to examples of NFC 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, NFC 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered.

Figure 4A:
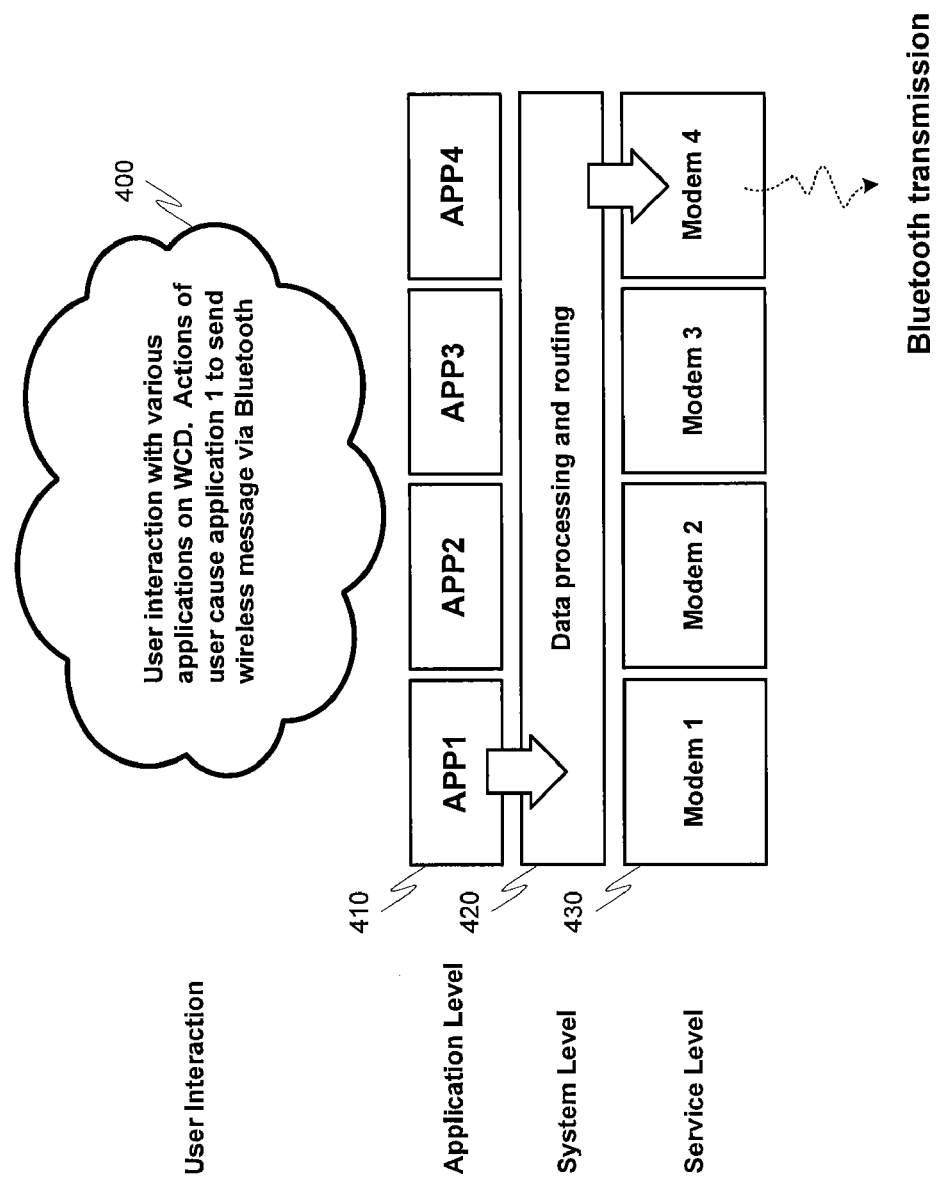
FIG. 4A discloses an exemplary operational description of a wireless communication device utilizing a wireless communication medium in accordance with at least one embodiment of the present invention.

FIG. 4A discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4A, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4A, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 4B discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 480. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 4B, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 4B, would cause packets to be lost and the need for retransmission of these lost packets. Retransmission requires that future timeslots be used to retransmit lost information, and therefore, overall communication performance will at least be reduced, if the signal is not lost completely. The present invention, in at least one embodiment, seeks to manage problematic situations where possibly conflicting communications may be occurring simultaneously so that interference is minimized or totally avoided, and as a result, speed and quality are maximized.

IV. Examples of Radio Modules Usable in a Wireless Communication Device.

Figure 5A:
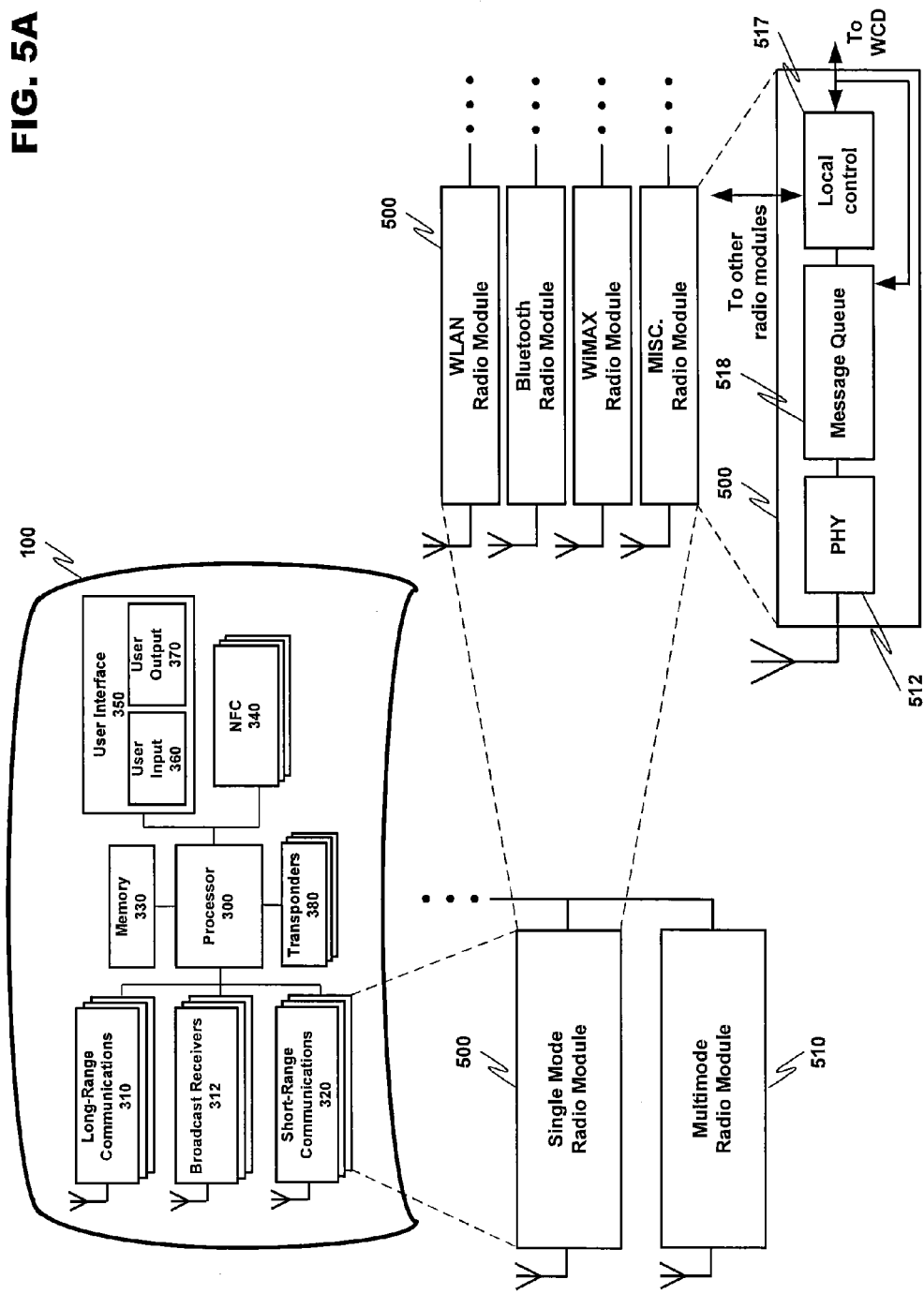
FIG. 5A discloses an example of single mode radio modules usable with at least one embodiment of the present invention.

FIG. 5A discloses two exemplary types of radio modules that can be incorporated into WCD 100. The choice of a particular type of radio module to utilize may depend on various requirements for functionality in WCD 100, or conversely, may be selected based on limitations in the device such as space, complexity and/or power limitations. In the depicted example, radio module 500 is a single mode radio module and radio module 510 is a multimode radio module (explained further in FIG. 5B). Single mode radio module 500 may only support one wireless communication medium at a time (e.g., single mode radio module 500 may be configured to support Bluetooth™ communication) and may further include all hardware and/or software resources required to enable independent operation as shown in FIG. 5A, or alternatively, a plurality of single mode radio modules 500 may share at least some physical resources with other radio modules (e.g., a common physical layer including an antenna or antenna array and associated hardware), depending on the construction and/or configuration of WCD 100.

Since all of the single mode radio modules 500 may compete for available communication resources (e.g., common hardware resources and/or available transmission time), some sort of local control may exist in order to manage how each single mode radio module 500 utilizes these resources. For example, Local controller 517 shown in single mode radio module 500 may control the operation of the radio module. This local controller may take as inputs message information from other components within WCD 100 wishing to send messages via single mode radio module 500, and also information from other single mode radio modules 500 as to their current state. This current state information may include a priority level, an active/inactive state, a number of messages pending, a duration of active communication, etc. Local controller 517 may use this information to control the release of messages from message queue 518 to PHY layer 512, or further, to control the quality level of the messages sent from message queue 518 in order to conserve resources for other wireless communication mediums. The local control in each single mode radio module 500 may take the form of, for example, a schedule for utilization of a wireless communication medium implemented in the radio module.

Figure 5B:
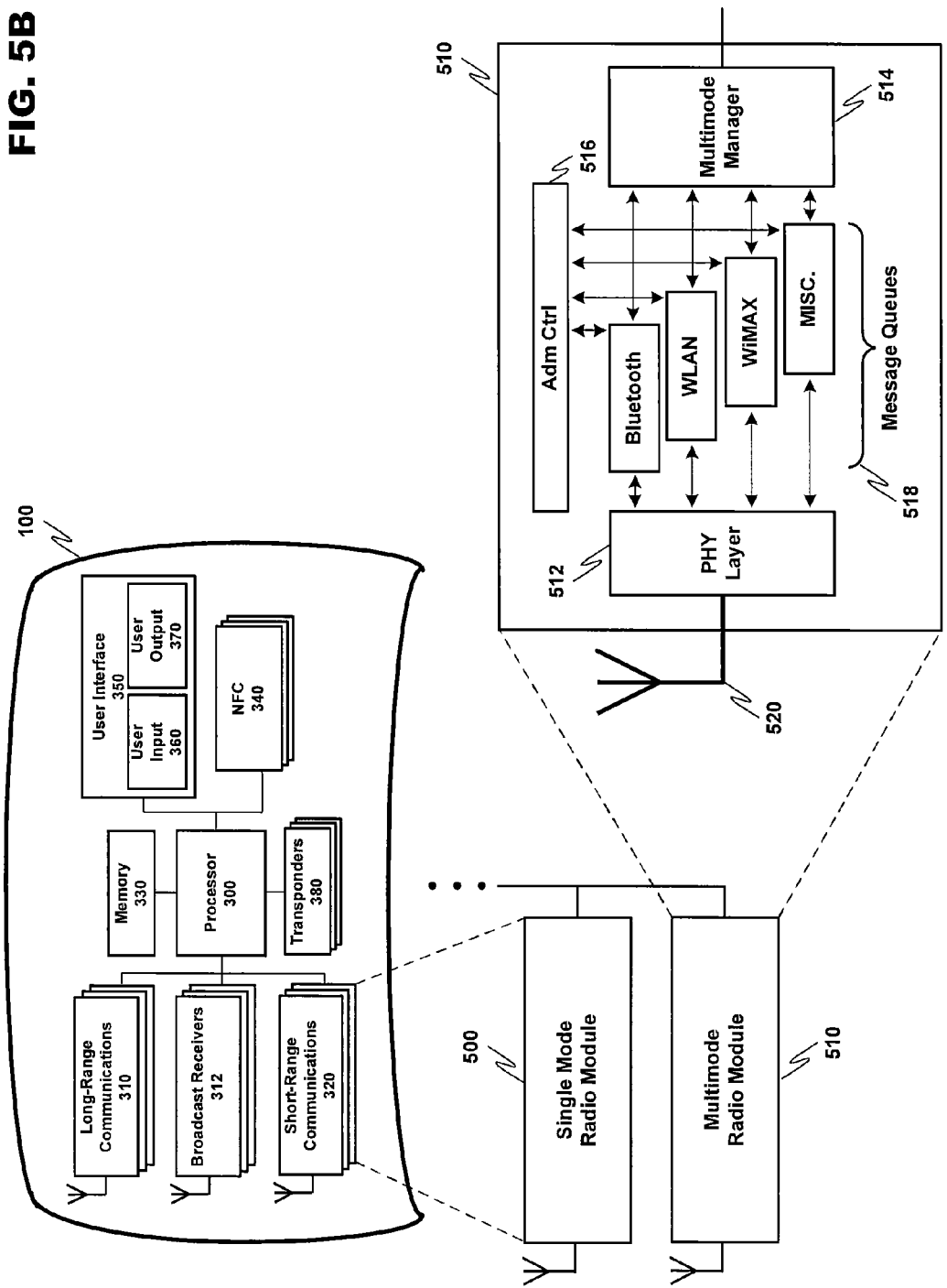
FIG. 5B discloses an example of a multimode radio module usable with at least one embodiment of the present invention.

An exemplary multimode radio module 510 is now explained in FIG. 5B. Multimode radio module 510 may include local control resources for managing each "radio" (e.g., software based radio control stacks) attempting to use the physical layer (PHY) resources of multimode radio module 510. In this example, multimode radio module 510 includes at least three radio stacks or radio protocols (labeled Bluetooth, WLAN and WiMAX in FIG. 5B) that may share the PHY layer resources (e.g., hardware resources, antenna, etc.) of multimode radio module 510. The local control resources may include an admission controller (Adm Ctrl 516) and a multimode controller (Multimode Manager 514). These local control resources may be embodied as a software program and/or in a hardware form (e.g., logic device, gate array, MCM, ASIC, etc.) in a dual-mode radio modem interface, and the radio modem interface may be coupled to, or alternatively, embedded within multimode radio module 510.

Admission control 516 may act as a gateway for the multimode radio module 510 by filtering out both different wireless communication medium requests from the operating system of WCD 100 that may be sent by multimode radio module 510 and that may further result in conflicts for multimode radio module 510. The conflict information may be sent along with operational schedule information for other radio modules to multimode manager 514 for further processing. The information received by multimode manager 514 may then be used to formulate a schedule, such as a schedule for utilization of wireless communication mediums, controlling the release of messages for transmission from the various message queues 518.

V. A Wireless Communication Device Including a Multiradio Controller.

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100.

Figure 6A:
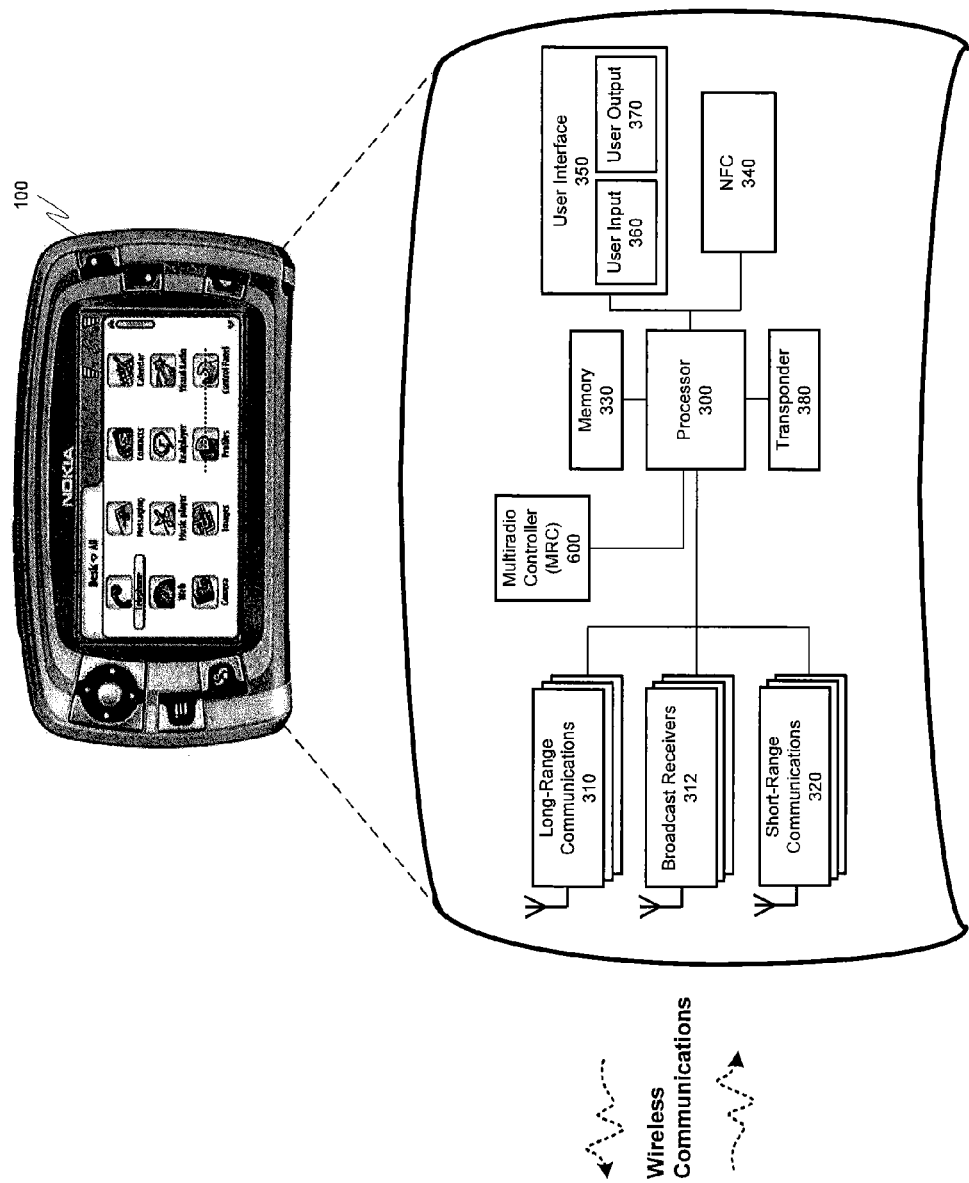
FIG. 6A discloses an exemplary structural description of a wireless communication device including a multiradio controller in accordance with at least one embodiment of the present invention.
Figure 6B:
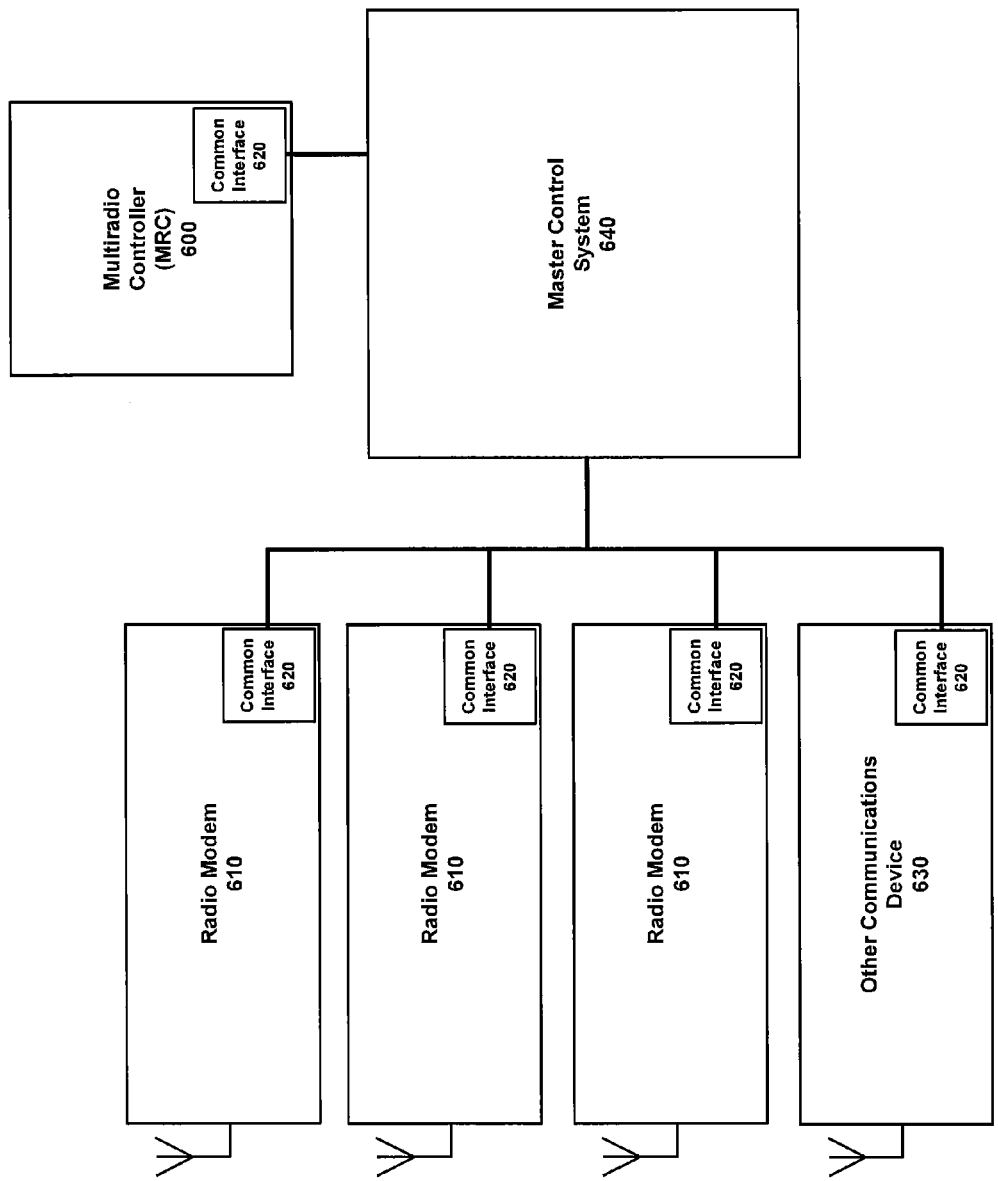
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Radio modems 610 and other devices 630 may also be referred to as "modules" in this disclosure as they may contain supporting hardware and/or software resources in addition to the modem itself. These resources may include control, interface and/or processing resources. For example, each radio modem 610 or similar communication device 630 (e.g., an RFID scanner for scanning machine-readable information) may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

VI. A Wireless Communication Device Including a Multiradio Control System.

Figure 7A:
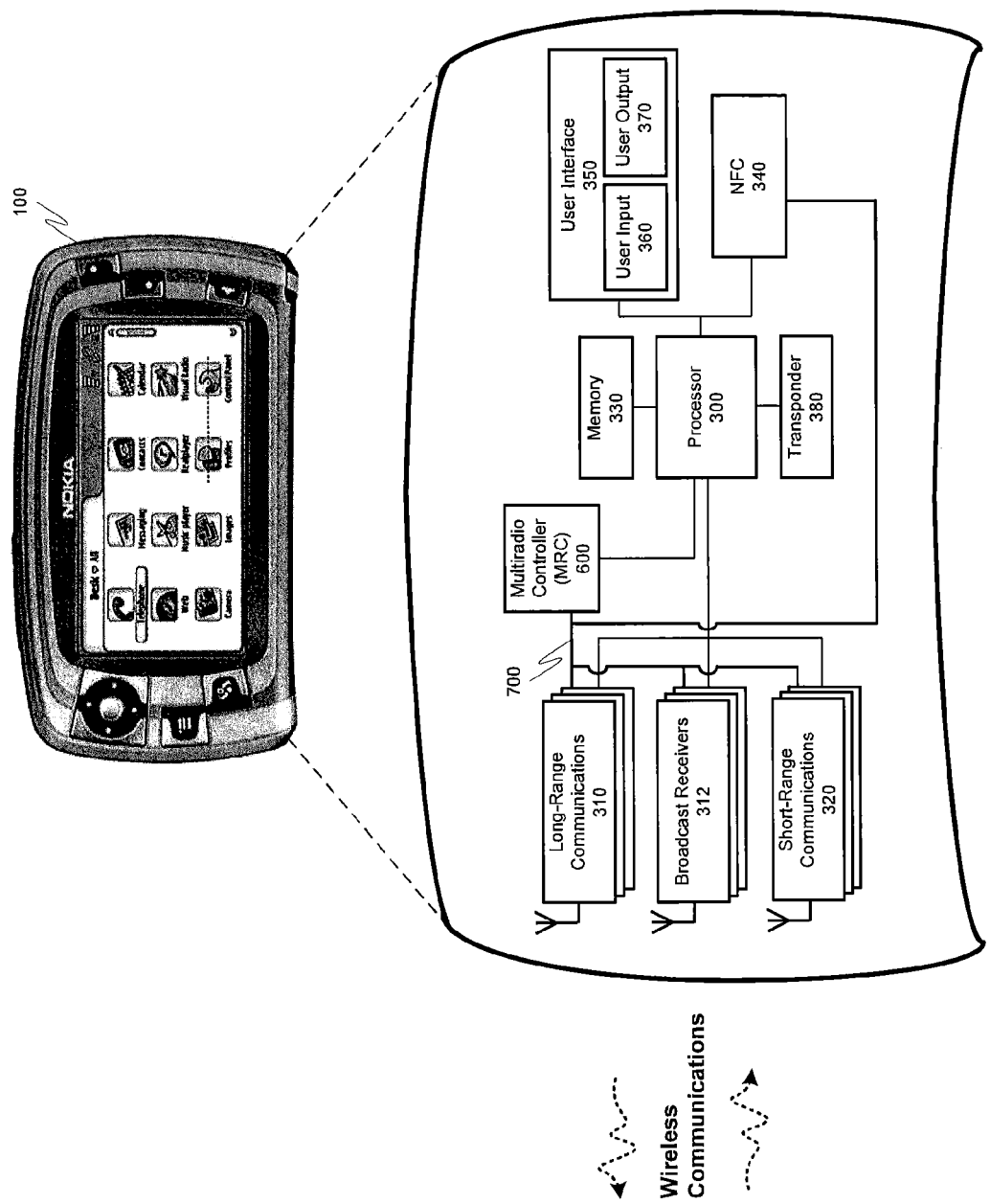
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communication resources of modules 310, 312, 320 and 340 to MRC 600. MCS 700 may provide a dedicated low-traffic communication structure for carrying delay sensitive information both to and from MRC 600.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

Figure 7C:
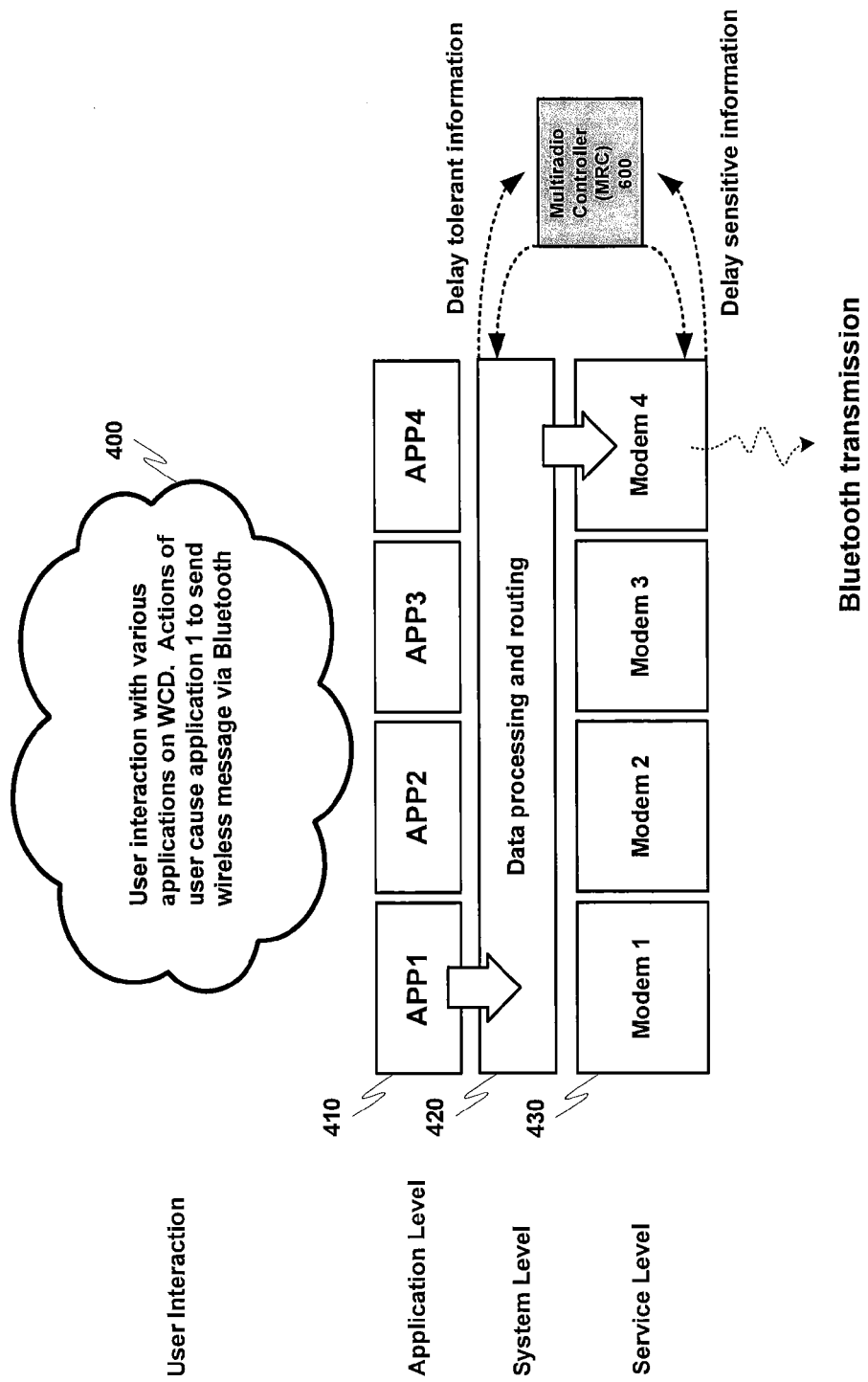
FIG. 7C discloses an exemplary operational description of a wireless communication device including a multiradio control system in accordance with at least one embodiment of the present invention.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc.

Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to a request by MRC 600, or may be delivered as a result of a change in radio modem settings during transmission, as will be discussed with respect to synchronization below.

MCS interface 710 may be used to (1) Exchange synchronization information, and (2) Transmit identification or prioritization information between various system components. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. This kind of event can be, for example, frame clock event in GSM (4.615 ms), slot clock event in Bluetooth™ (625 us) or targeted beacon transmission time in WLAN (100 ms) or any multiple of these. A radio modem 610 may send its synchronization indications when (1) Any radio modem 610 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of MRC 600.

For predictive wireless communication mediums, the radio modem activity control may be based on the knowledge of when the active radio modems 610 are about to transmit (or receive) in the specific connection mode in which the radios are currently operating. The connection mode of each radio modem 610 may be mapped to the time domain operation in their respective local control. As an example, for a GSM speech connection, priority controller 740 may have knowledge about all traffic patterns of GSM. This information may be transferred to the appropriate local control when radio modem 610 becomes active, which may then recognize that the speech connection in GSM includes one transmission slot of length 577 μs, followed by an empty slot after which is the reception slot of 577 μs, two empty slots, monitoring (RX on), two empty slots, and then it repeats. Dual transfer mode means two transmission slots, empty slot, reception slot, empty slot, monitoring and two empty slots. When all traffic patterns are known, a controller only needs to know when the transmission slot occurs in time to gain knowledge of when the GSM radio modem is active. When active radio modem 610 is about to transmit (or receive) it must check every time whether the modem activity control signal permits the communication per any local control entity, which is always either allowing or disabling the transmission of one full radio transmission block (e.g., GSM slot).

An example message packet 800 is disclosed in FIG. 8 in accordance with at least one embodiment of the present invention. Example message packet 800 includes activity pattern information that may be formulated by MRC 600. The data payload of packet 800 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 800, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. Further, changes in radio modem 610 activity patterns may be amended using the validity information in each message packet 800.

The modem activity control signal (e.g., packet 800) may be formulated by MRC 600 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600. The same happens if a radio modem time reference or connection mode changes. A problem may occur if MRC 600 runs out of the modem synchronization and starts to apply modem transmission/reception restrictions at the wrong time. Due to this, modem synchronization signals need to be updated periodically. The more active wireless connections, the more accuracy is required in synchronization information.

VII. Radio Modem Interface to Other Devices.

As a part of information acquisition services, the MCS interface 710 needs to send information to MRC 600 about periodic events of the radio modems 610. Using its MCS interface 710, the radio modem 610 may indicate a time instance of a periodic event related to its operation. In practice these instances are times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit

[x] ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600.

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller.

In at least one embodiment of the present invention, the various messages exchanged between the aforementioned communication components in WCD 100 may be used to dictate behavior on both a local (radio modem level) and global (WCD level) basis. MRC 600 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

VIII. Shared Timeslots.

FIG. 9A-9C disclose some examples of communication activity including at least two wireless communication mediums in accordance with at least one embodiment of the present invention. An activity progression corresponding to each wireless communication medium depicts time periods passing from left to right (the direction of the arrow), wherein timeslots containing different indications of permissions and activities are disclosed. The permissions include periods of time wherein a particular wireless communication medium is allowed to communicate (e.g., a dedicated timeslot), and periods of time wherein a plurality of wireless communication mediums are directed to share the reserved time period (e.g., a shared timeslot). Further, while the present example makes reference to the Bluetooth™ and WLAN wireless communication mediums, the present invention is not limited in this regard. These particular wireless communication mediums have been selected only for the sake of explanation in this disclosure since they are well known to one of ordinary skill in the art and also operate in the same frequency range. The present invention may in actuality be applied to the management of any potentially conflicting wireless communication mediums operating within the same device.

Bluetooth™ communication may be composed of both Asynchronous Connectionless Links (ACL), often used to establish a network connection, and Synchronous Connection Oriented Links (SCO) for scheduled communication. A SCO link reserves slots between the master and the slave and can therefore be considered to provide a circuit switched connection. SCO is usually used to support time critical information (e.g. voice packets), and therefore, SCO packets are never retransmitted. eSCO is a modification of traditional SCO communication that allows limited retransmission of message packets in a short timeframe. Case A disclosed in FIG. 9A is an example where no scheduling is employed by MRC 600 for ACL communication (only the periodic SCO packets are scheduled). An exemplary SCO packet is shown at 900. Also in this example, timeslots falling between scheduled SCO packets 900 are reserved for use by other wireless communication mediums in WCD 100 (e.g., shown at 902).

FIG. 9A further discloses both successful and unsuccessful message transactions. For example, a successful Bluetooth™ SCO message transmission occurs during the allowed timeslot 900 and in each subsequent scheduled SCO timeslot. This may occur, for example, since these timeslots include the only dedicated time allocation in this example. As further shown in FIG. 9A, unscheduled communication may attempt to transmit in any slot 902 reserved for other wireless communication mediums, and as a result, collisions are foreseeable. Some exemplary communication failures are shown in FIG. 9A at 904-912. The failures at 904 and 906 include unscheduled Bluetooth™ ACL communication that may, for example, attempt to transmit during a timeslot 902 reserved for other wireless communication mediums. The packet loss may ultimately cause a Bluetooth™ failure since the control information carried over ACL will not be sent/received, and therefore, the entire link may be considered broken. Further, since WLAN operates in a substantially unscheduled manner, it may attempt to communicate whenever a message is pending for transmission. As a result, numerous collisions are shown at 908-912 wherein WLAN may attempt to communicate during a slot reserved for SCO packets. These failures may require packet retransmission, slowing down the communication speed for WLAN, and further compromising the overall wireless communication efficiency for WCD 100.

Now referring to FIG. 9B, Case B discloses another exemplary situation wherein both SCO and ACL packets are scheduled in the Bluetooth™ wireless communication medium. The scheduling of all SCO and ACL transmission may allow Bluetooth to function more stably due to the fact that the probability for communication errors may be reduced. However, ensuring that all Bluetooth™ packets will be successful may create increased problems in other wireless communication mediums. In this particular scenario, scheduling all Bluetooth™ communication causes the majority of the available timeslots to be reserved as dedicated timeslots. Since there is little available time left to operate, WLAN may experience increased packet failures, including new communication errors indicated at 914 and 916. Again, overall communication efficiency for WCD 100 may then suffer due to the fact that MRC 600 may reserve time for planned ACL packets even though the time will not actually be used. The unused allocation may result in a waste of resources for WCD 100 wherein WLAN could have utilized these reserved timeslots.

FIG. 9C discloses exemplary Case C including a schedule that may also allocate shared timeslots in accordance with at least one embodiment of the present invention. In this example, SCO timeslots are still reserved as dedicated time in Bluetooth™. Dedicated timeslots may be necessary in this case since SCO packets cannot be repeated, and therefore, the loss of a single SCO packet may break the Bluetooth™ link. The balance of the communication slots may then be identified as shared amongst the two or more wireless communication mediums. This is shown in FIG. 9C wherein, due to sharing the timeslot allocation, packets indicated at 918-922 in FIG. 9C that were unsuccessful in the previous examples are now able to be sent.

A shared timeslot allows local control in the one or more radio modules 610 supporting the wireless communication mediums to negotiate use of the reserved time. This means that local control 517 in the case of single mode radio modems 500, or adm control 516 and/or multimode manager 517 in the case of multimode radio module 510, may receive status information related to the various wireless communication mediums assigned to a particular shared timeslot. This information may be provided by MRC 600, or alternatively, may be exchanged ad-hoc between various radio modules 610, and may include at least information about the active wireless communication mediums such as the number of messages pending for each medium, the age of the messages pending for each medium, the time each medium has spent actively communicating, usage statistics (e.g., the last time the medium was allowed to communicate), the applications in WCD 100 utilizing each medium, etc. In a simple scenario, this information may help determine that only one wireless communication medium requires use of the shared timeslot, and therefore, the shared timeslot may be utilized on a first come-first serve basis. In a more complicated situation where multiple radio modules may be competing for use of at least a portion of the shared timeslot, the status information may also allow the various radio modules 610 (e.g., including both single mode 500 and/or multimode modules 510) supporting the wireless communication mediums to determine a relative priority between the wireless communication mediums sharing the timeslot. After determining the relative priority, a utilization order may then be assigned amongst the various wireless communication mediums assigned to the shared timeslots for using the subsequent shared timeslots (e.g., the highest priority wireless communication medium may communicate in the next shared timeslot).

Local control entities in the one or more radio modules 610 may communicate their status information using either common interface 620 and/or via MCS interface 710 if communicating delay-sensitive information. For example, a particular radio module 610 that is supporting a wireless communication medium may be about to experience a link disconnection because a message has not been sent recently. The particular radio module 610 may then send a message via MCS interface 710 requesting the highest priority in the next available shared timeslot. This message may be received by other radio modules 610 and/or by MRC 600. As a result, the other radio modules may allow the particular radio module 610 that is experiencing a potential communication failure to transmit, and further, MRC 600 may reallocate both dedicated timeslots and/or shared timeslots to maximize the efficiency of communications in WCD 100 while still preserving signal integrity. The allocation of high priority to a particular wireless communication medium is not limited only to this exemplary situation, and may further be based on other exemplary scenarios such as a large amount of messages waiting to be sent (high traffic) for a particular wireless communication medium, a high priority application demanding communication priority for the wireless communication medium it is using to send its data, etc.

Figure 10:
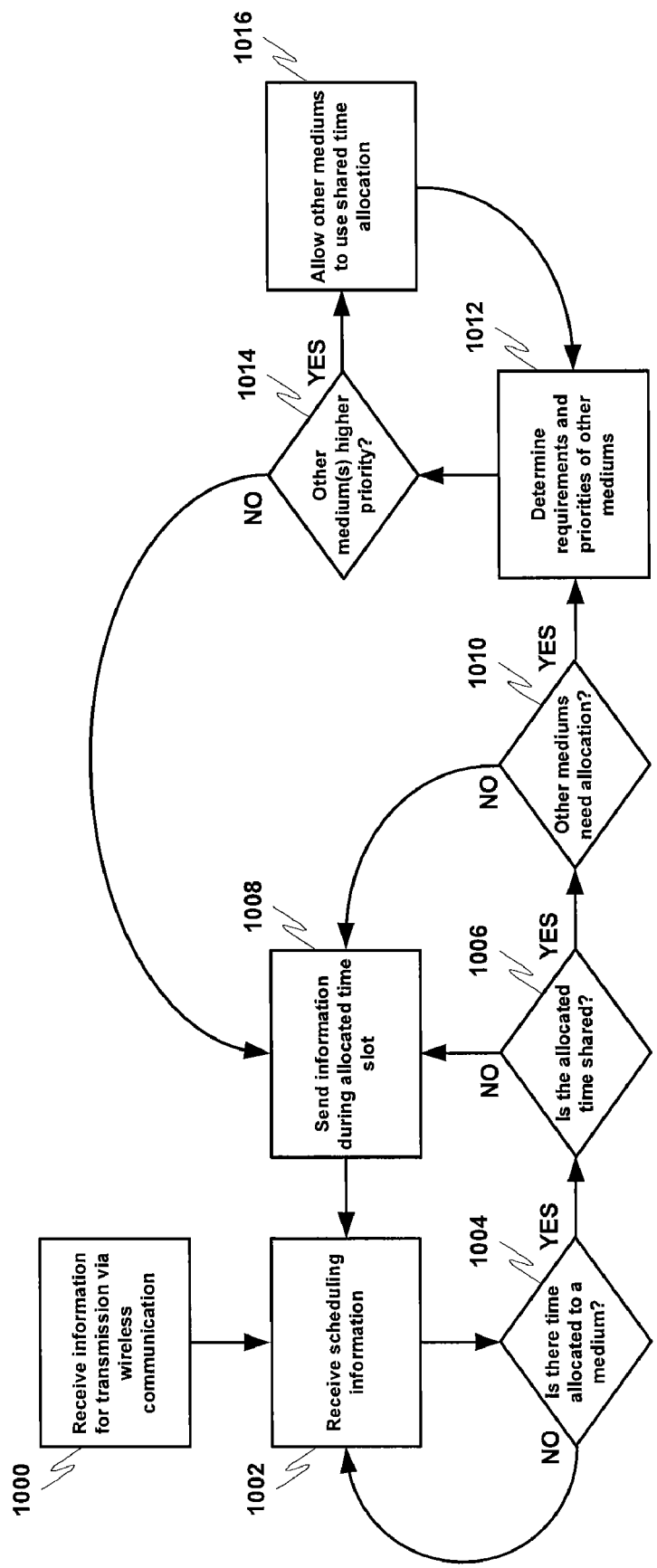
FIG. 10 discloses an exemplary flowchart for a process of controlling the utilization of allocated time in accordance with at least one embodiment of the present invention.

Now referring to FIG. 10, a flowchart depicting an exemplary process flow for managing communication in WCD 100 in accordance with at least one embodiment of the present invention is now disclosed. In step 1000, at least one message for transmission using a particular wireless communication medium are received in a radio module 610. The message(s) may be forwarded to radio module 610 from other resources within WCD 100, for example, a software application prompted by user interaction. This information may also be accompanied by operational schedule information for the particular wireless communication medium (step 1002). The radio module 610 (e.g., including both single mode 500 and/or multimode modules 510) may then determine if any timeslots have been allocated to radio module 610 for supporting the one or more wireless communication mediums. If no time has been allocated, then radio module 610 must delay until the next scheduling cycle to await an allocation (e.g., return to step 1002). Otherwise, in step 1006 the reserved time is checked to determine if the time includes shared timeslots or dedicated timeslots. If the timeslots are dedicated to the particular wireless communication medium, then in step 1008, any messages pending for the particular wireless communication medium may be sent within these dedicated timeslots without delay.

Alternatively, if the timeslots are shared timeslots, then in step 1010 a determination may be made as to whether any other wireless communication medium also sharing the timeslot is in need of the timeslot for transmitting and/or receiving messages. If no other wireless communication medium sharing the timeslot requires use of the timeslot, then the radio module 610 supporting the wireless communication medium with messages pending may send these messages in step 1008. Alternatively, if other wireless communication mediums sharing the timeslot do have a messages pending for the timeslot, then a further determination may be made in step 1012 as to the requirements and priorities of all of the wireless communication mediums sharing the timeslot. If, after this further determination, the other wireless communication mediums are found to have a higher priority in step 1014, then these wireless communication mediums may utilize the next available slot in step 1016 until no other higher priority wireless communication mediums exist. When the further determination is "no" in step 1014, the radio modem 610 supporting the particular wireless communication medium with messages pending may transmit these messages in step 1008. The process flow may then restart with the receipt of new operational schedule information in step 1002. Further, the process flow previously set forth may manage communication for a plurality of wireless communication mediums supported by a plurality of single mode radio modules 500, supported by both single mode radio modules 500 and multimode radio modules 510, or within a single multimode radio module 510 supporting the plurality of wireless communication mediums.

Figure 11:
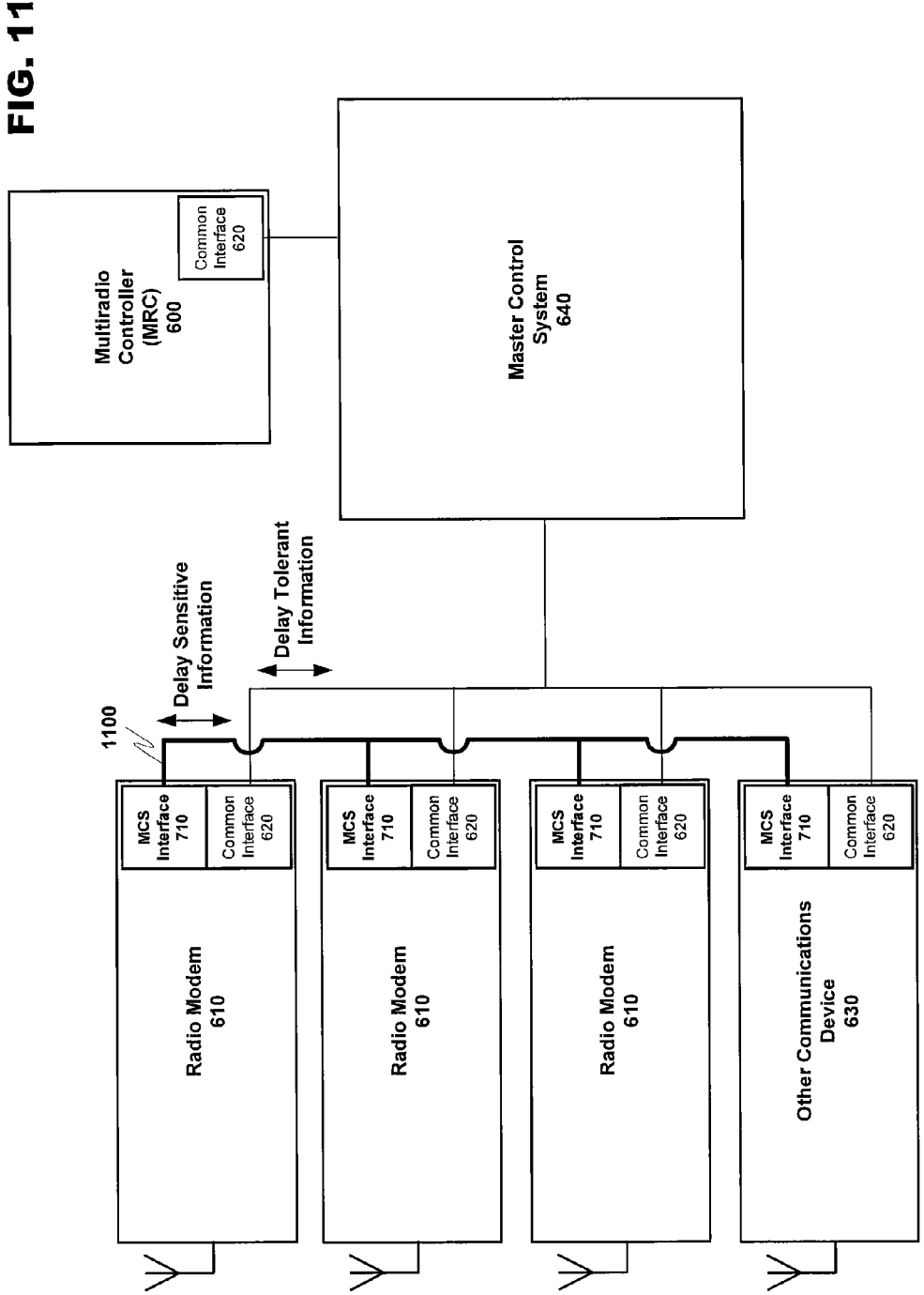
FIG. 11 discloses an exemplary alternative communication configuration in accordance with at least one embodiment of the present invention.

In an alternative communication configuration, for example, as disclosed in FIG. 11, a communication bus for conveying delay-sensitive information may exist only to couple the various radio modules 610 in WCD 100. Similar to MCS 700, radio module bus 1100 may connect all radio modules 610 together in order to provide a conveyance path for time critical messages that is immune from the effect of other communication traffic in WCD 100. This configuration may now be possible because the allocation of shared timeslots may result in a reduced scheduling burden for MRC 600. More specifically, the requirement for scheduling dedicated timeslots may be reduced since competing radio modules 610 may now negotiate their own usage in shared timeslots. As a result, MRC 600 may have less scheduling to process (e.g., a "basic" or "rudimentary" schedule may suffice instead of a detailed operational schedule), and further, the schedule information may be refreshed less frequently via common interface 620. MRC 600 may now utilize common interface 620, for example, because the operational schedule it provides is not as delay-sensitive as compared to a scenario where all scheduled timeslots are dedicated. This configuration may provide a benefit through increased flexibility in WCD 100 design. For example, a cost, power, space and/or complexity reduction may be realized in the design of WCD 100 by not having to couple MRC 600 to radio modules 610 through MCS 700.

Figure 12:
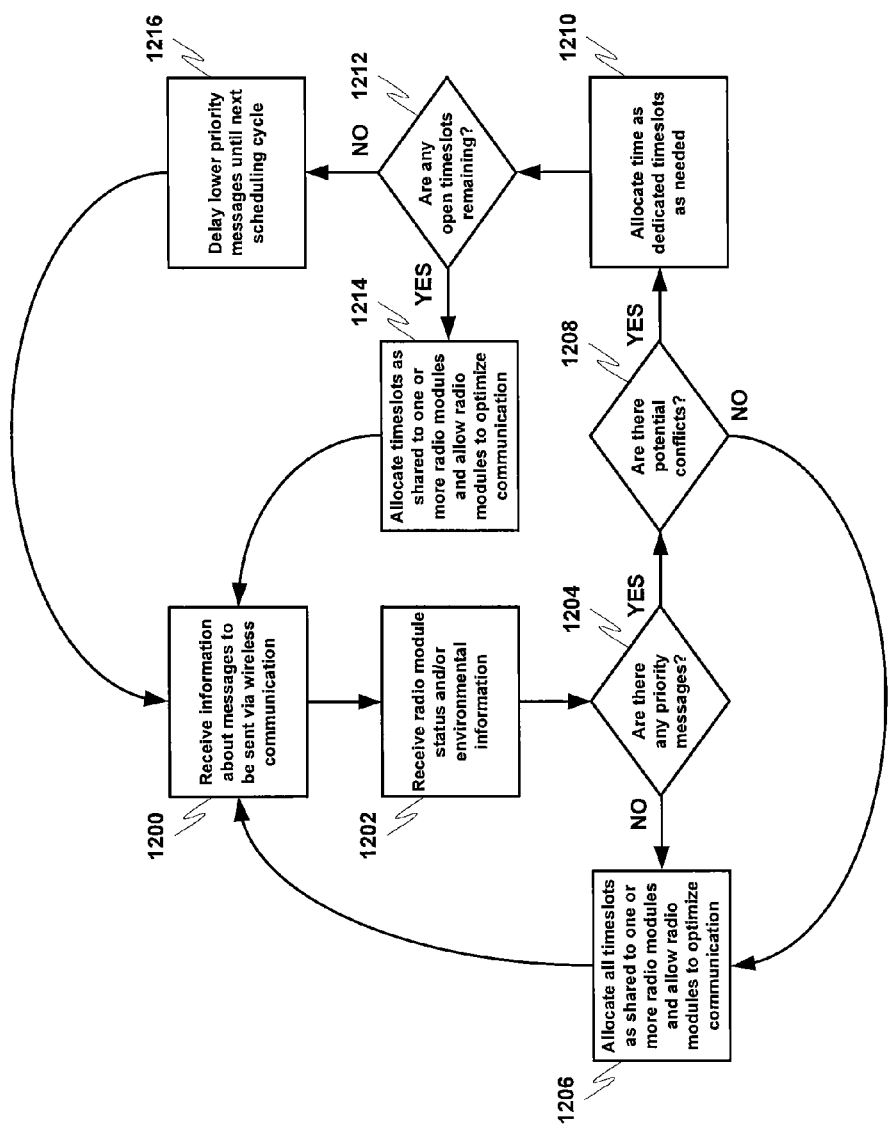
FIG. 12 discloses an exemplary flowchart for a process of allocating timeslots in accordance with at least one embodiment of the present invention.

An exemplary process for computing an operational schedule in accordance with at least one embodiment of the present invention is disclosed in FIG. 12. In step 1200, MRC 600 may receive information from other resources in WCD 100 regarding messages that are to be sent via wireless communication. Other resources in WCD 100 may include, for example, applications that receive commands and/or data input from user 110 via user interface 240. MRC 600 may further receive radio module status information or environmental information in step 1202. This information may include current data regarding the condition and/or loading of each radio module 610. For example, a large backlog of messages waiting for a particular wireless communication medium may justify a higher priority for the supporting radio module 610. Further, environmental information may include information sensed on disturbances (e.g., general radio traffic on a communication channel) that would preclude the transmission of information for a particular radio module 610 that otherwise would be considered high priority.

MRC 600 may utilize this information in order to compute an operational schedule for radio modules 610. In step 1204 a determination may be made as to whether, based on the received information, any particular wireless communication medium and/or radio module 610 would be considered high priority. The priority may be determined in accordance with any of the aforementioned criteria discussed in this disclosure or known in the art. If high priority is deemed unnecessary (e.g., only one radio module is active) then in step 1206 all of the time may be assigned as shared. Assigning all available timeslots as shared makes this time available to one or more radio modules 610 that require bandwidth, and as a result, MRC 600 may relegate control decisions for these shared timeslots to local control in radio modules 610.

As set forth above, shared timeslots may be assigned to one or more active radio modules 610. More specifically, there may be scenarios where MRC 600 may selectively assign certain radio modules 610 to a shared timeslot, and therefore, not all of the active radio modules 610 would be permitted to operate during this time period. For example, only one multimode radio module 510 may be assigned by MRC 600 to operate in a particular shared timeslot. This selective assignment may permit the multimode module 510 to balance available resources between the wireless communication mediums it alone supports without having to worry about the requirements of other radio modules 610 (e.g., no inter-module coordination). During and/or after the shared timeslots are allocated in step 1206, the process may restart with new message information being received in step 1200. On the other hand, if at least one priority situation exists, then in step 1208 another determination may be made as to whether any potential conflicts exist between wireless communication mediums. If no potential conflicts exist, then all timeslots may be allocated as shared as previously described in step 1206. After step 1206 the process may then restart at step 1200. Otherwise, in step 1210 dedicated timeslots may be assigned to the various active wireless communication mediums in WCD 100 as deemed necessary.

If additional unassigned timeslots remain after all required dedicated timeslots have been reserved (step 1212), then in step 1214 the remaining timeslots may be allocated as shared timeslots. As previously described above, this allocation of shared timeslots relegates communication management to local controllers in each of the one or more radio modules 610 assigned to operate in the shared timeslots. If MRC 600 requires all available timeslots to be allocated as dedicated timeslots due to, for example, a substantial amount of high priority messaging, then in step 1216 messages pending in lower priority wireless communication mediums may be delayed until the next scheduling cycle starting in step 1200, wherein some timeslots may become available for sharing amongst the wireless communication mediums.

Accordingly, it will be apparent to persons skilled in the relevant art that various changes information and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   receiving a request at a radio module in a device to transmit at least one message via a wireless communication medium;
   receiving schedule information including one or more periods of time when the radio module is allowed to communicate via the wireless communication medium, the one or more periods of time being scheduled as timeslots during which access to the wireless communication medium is dedicated for the radio module or timeslots during which access to the wireless communication medium for the radio module is shared with one or more other radio modules;
   controlling operation of the radio module by:
      transmitting the at least one message via the wireless communication medium during timeslots scheduled as dedicated for the radio module; and
      determining a relative priority for the radio module with respect to the one or more other radio modules and transmitting the at least one message via the wireless communication medium according to the relative priority during timeslots scheduled as shared with the one or more other radio modules.

2. The method of claim 1, wherein the schedule information is received from a multiradio controller also in the apparatus.

3. The method of claim 1, wherein determining a relative priority for the radio module includes determining other wireless communication mediums sharing the one or more timeslots.

4. The method of claim 3, wherein determining a relative priority for the radio module includes determining all of the wireless communication mediums sharing the one or more timeslots that want to communicate during the one or more shared timeslots.

5. The method of claim 1, wherein determining a relative priority for the radio module includes negotiating communication requirements with the one or more other radio modules.

6. The method of claim 1, wherein determining a relative priority for the radio module includes balancing communication requirements among a plurality of wireless communication mediums supported in the radio module.

7. A computer program product comprising a computer executable program code recorded on a non-transitory computer readable storage medium, the computer executable program code comprising:
   code for causing a radio module in a device to receive a request to transmit at least one message via a wireless communication medium;
   code for causing the apparatus to receive schedule information including one or more periods of time when the radio module is allowed to communicate via the wireless communication medium, the one or more periods of time being scheduled as timeslots during which access to the wireless communication medium is dedicated for the radio module or timeslots during which access to the wireless communication medium for the radio module is shared with one or more other radio modules;

code for causing the apparatus to control operation of the radio module by:

transmitting the at least one message via the wireless communication medium during timeslots scheduled as dedicated for the radio module; and determining a relative priority for the radio module with respect to the one or more other radio modules and transmitting the at least one message via the wireless communication medium according to the relative priority during timeslots scheduled as shared with the one or more radio modules.

8. The computer program product of claim 7, wherein the schedule information is received from a multiradio controller also in the apparatus.

9. The computer program product of claim 7, wherein determining a relative priority for the radio module includes determining other wireless communication mediums sharing the one or more timeslots.

10. The computer program product of claim 9, wherein determining a relative priority for the radio module includes determining all of the wireless communication mediums sharing the one or more timeslots that want to communicate during the one or more shared timeslots.

11. The computer program product of claim 7, wherein determining a relative priority for the radio module includes negotiating communication requirements with the one or more other radio modules.

12. The computer program product of claim 7, wherein determining a relative priority for the radio module includes balancing communication requirements among a plurality of wireless communication mediums supported in the radio module.

13. A device comprising:

one or more radio modules; and at least one multiradio controller coupled to the one or more radio modules;

wherein the device is configured to:

receive a request at a radio module in the one or more radio modules to transmit at least one message via a wireless communication medium;

receive schedule information including one or more periods of time when the radio module is allowed to communicate via the wireless communication medium, the one or more periods of time being scheduled as timeslots during which access to the wireless communication medium is dedicated for the radio module or timeslots during which access to the wireless communication medium for the radio module is shared with the one or more other radio modules;

control operation of the radio module by:

transmitting the at least one message via the wireless communication medium during timeslots scheduled as dedicated for the radio module; and determining a relative priority for the radio module with respect to the one or more other radio modules and transmit the at least one message via the wireless communication medium according to the relative priority during timeslots scheduled as shared with the one or more other radio modules.

14. The device of claim 13, wherein the schedule information is received from the multiradio controller.

15. The device of claim 13, wherein determining a relative priority for the radio module includes determining other wireless communication mediums sharing the one or more timeslots.

16. The device of claim 15, wherein determining a relative priority for the radio module includes determining all of the wireless communication mediums sharing the one or more timeslots that want to communicate during the one or more shared timeslots.

17. The device of claim 13, wherein determining a relative priority for the radio module includes negotiating communication requirements with the one or more other radio modules.

18. The device of claim 13, wherein determining a relative priority for the radio module includes balancing communication requirements among a plurality of wireless communication mediums supported in the radio module.

19. A device comprising:

means for receiving a request at a radio module in an apparatus to transmit at least one message via a wireless communication medium;

means for receiving schedule information including one or more periods of time when the radio module is allowed to communicate via the wireless communication medium, the one or more periods of time being scheduled as timeslots during which access to the wireless communication medium is dedicated for the radio module or timeslots during which access to the wireless communication medium for the radio module is shared with one or more other radio modules;

means for controlling operation of the radio module by:

transmitting the at least one message via the wireless communication medium during timeslots scheduled as dedicated for the radio module; and determining a relative priority for the radio module with respect to the one or more other radio modules and transmitting the at least one message via the wireless communication medium according to the relative priority during timeslots scheduled as shared with the one or more radio modules.

20. The device of claim 19, wherein the schedule information is received from a multiradio controller also in the device.

21. A radio module, comprising:

a radio modem configured to send wireless messages via a wireless communication medium;

a message queue for holding one or more pending wireless messages;

a controller coupled to at least the radio modem and the message queue;

one or more transmitters coupled to at least the controller and configured to send information to at least one of a multiradio controller and other radio modules; and one or more receivers coupled to at least the controller and configured to receive at least one of schedule information including one or more periods of time when a radio module is allowed to communicate and information from other radio modules;

wherein the controller is configured to:

receive a request at the radio module to transmit at least one message via a wireless communication medium;

receive schedule information including one or more periods of time when the radio module is allowed to communicate via the wireless communication medium, the one or more periods of time being scheduled as timeslots during which access to the wireless communication medium is dedicated for the radio module or timeslots during which access to the wireless communication medium for the radio module is shared with the one or more other radio modules;

control operation of the radio module by:
transmitting the at least one message via the wireless communication medium during timeslots scheduled as dedicated for the radio module; and
determining a relative priority for the radio module with respect to the one or more other radio modules and transmit the at least one message via the wireless communication medium according to the relative priority during timeslots scheduled as shared with the one or more radio modules.

22. The radio module of claim 21, wherein the transmitter and receiver communicate over a communication bus dedicated to conveying delay-sensitive information.

23. A radio module, comprising:
a radio modem configured to send wireless messages via a plurality of wireless communication mediums;
a plurality of message queues for holding one or more pending wireless messages;
a controller coupled to at least the radio modem and the plurality of message queues;
one or more transmitters coupled to at least the controller and configured to send information to at least a multiradio controller; and
one or more receivers coupled to at least the controller and configured to receive at least schedule information including one or more periods of time when a radio module is allowed to communicate;
wherein the controller is configured to:
receive a request at the radio module to transmit at least one message via a wireless communication medium;
receive schedule information including one or more periods of time when the radio module is allowed to communicate via the wireless communication medium, the one or more periods of time being scheduled as timeslots during which access to the wireless communication medium is dedicated for the radio module or timeslots during which access to the wireless communication medium for the radio module is shared with the one or more other radio modules;
control operation of the radio module by
transmitting the at least one message via the wireless communication medium during timeslots scheduled as dedicated for the radio module; and
determining a relative priority for the radio module with respect to the one or more other radio modules and transmit the at least one message via the wireless communication medium according to the relative priority during timeslots scheduled as shared with the one or more other radio modules.

24. The radio module of claim 23, wherein the transmitter and receiver are further configured to send and receive information to other radio modules.

25. The radio module of claim 23, wherein at least one transmitter and receiver are components of an interface coupled to a communication bus which is dedicated to conveying delay-sensitive information.

26. The radio module of claim 25, wherein the communication bus is dedicated to conveying delay-sensitive radio module status information between a plurality of radio modules incorporated in a wireless communication device.

27. A method, comprising:
receiving a request to transmit one or more messages via at least one radio module supporting at least one wireless communication medium;
receiving loading information related to at least one of the at least one radio module and the at least one wireless communication medium;
determining whether any of the one or more messages are high priority messages;
if any of the messages are high priority messages, and a potential communication conflict exists, scheduling timeslots during which access to the wireless communication medium is dedicated for the radio module in an operational schedule for the high priority messages;
scheduling any other available timeslots as timeslots during which access to the wireless communication medium for the radio modules is shared in the operational schedule with one or more other radio modules; and
communicating the operational schedule to the at least one radio module.

28. A multiradio controller, comprising:
at least one interface module for facilitating communication; and
a control module, coupled to at least the interface module, wherein the control module is configured to:
receive a request to transmit one or more messages via at least one radio module supporting at least one wireless communication medium;
receive loading information related to at least one of the at least one radio module and the at least one wireless communication medium;
determine whether any of the one or more messages are high priority messages;
if any of the messages are high priority messages, and a potential communication conflict exists, schedule timeslots during which access to the wireless communication medium is dedicated for the radio module in an operational schedule for the high priority messages;
schedule any other available timeslots as timeslots during which access to the wireless communication medium for the radio module is shared in the operational schedule with one or more other radio modules; and
communicate the operational schedule to the at least one radio module.

29. A system, comprising:
one or more radio modules imbedded in a wireless communication device;
a multiradio controller, coupled to the one or radio modules;
at least one of the one or more multiradio modules receiving a request to transmit at least one message via a wireless communication medium;
the at least one radio module receiving schedule information from the multiradio controller, the schedule information including one or more periods of time when the at least one radio module is allowed to communicate via the wireless communication medium, the one or more periods of time being scheduled as timeslots during which access to the wireless communication medium is dedicated for the radio module or timeslots during which access to the wireless communication medium for the radio module is shared with one or more radio modules;

the at least one radio module transmitting the at least one message via the wireless communication medium during timeslots scheduled as dedicated for the at least one radio module; and the at least one radio module further determining a relative priority for the radio module with respect to the one or more other radio modules and transmitting the at least one message via the wireless communication medium according to the relative priority during timeslots scheduled as shared with the one or more other radio modules.

* * * * *